UNITED STATES PATENT OFFICE.

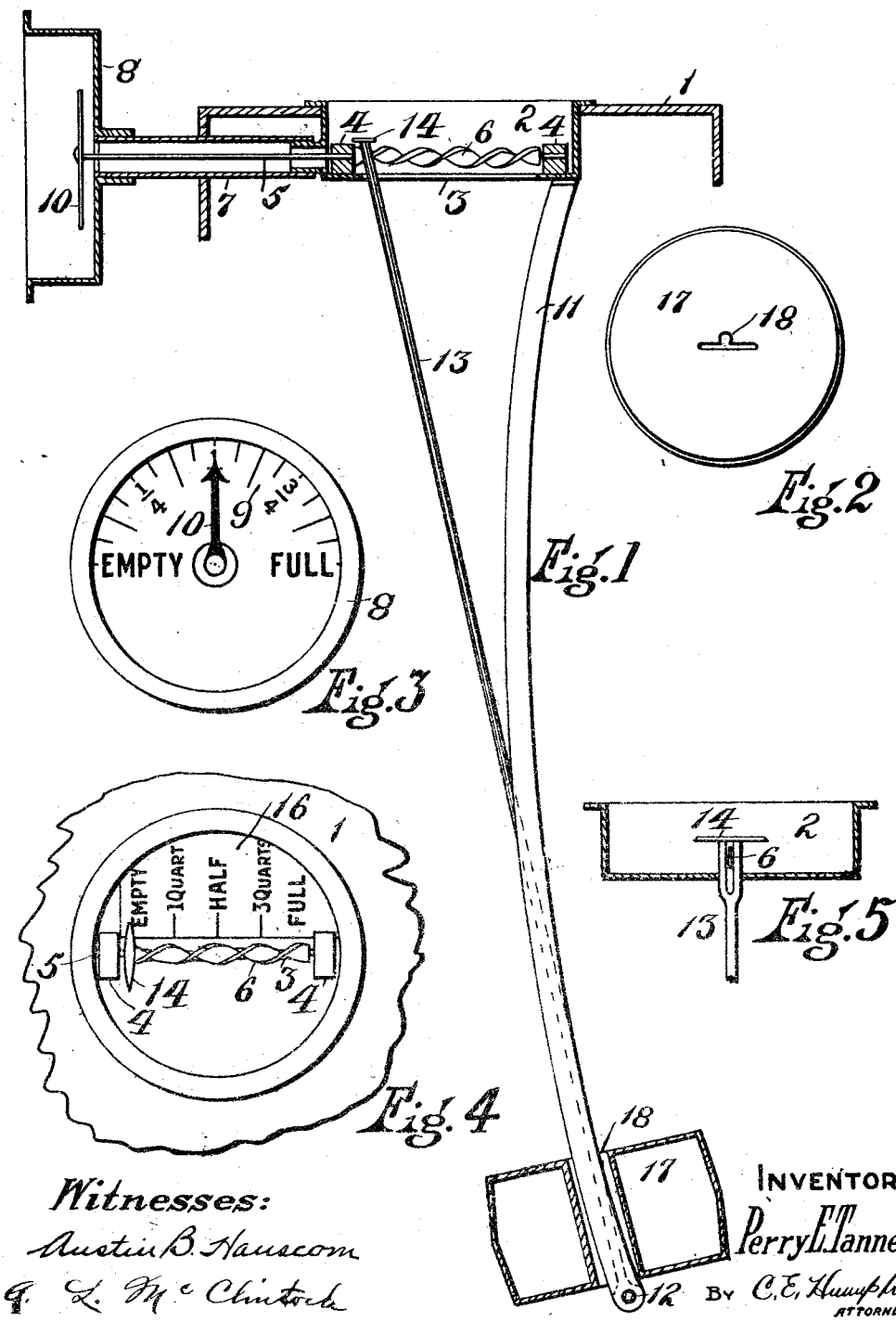

PERRY E. TANNER, OF AKRON, OHIO.

FLUID-GAGE.

1,090,425.  Specification of Letters Patent.  Patented Mar. 17, 1914.

Application filed August 24, 1912. Serial No. 716,897.

*To all whom it may concern:*

Be it known that I, PERRY E. TANNER, a citizen of the United States, residing at Akron, in the county of Summit and State of Ohio, have invented new and useful Improvements in Fluid-Gages, of which the following is a specification.

This invention relates to improvements in fluid gages used to determine the level of a fluid in a receptacle to thereby indicate the quantity contained therein.

Broadly, the object of the invention is to produce a gage of great simplicity, efficiency and cheapness in which the parts are reduced to a minimum without affecting the operation of the gage.

More specifically, the invention contemplates providing a pair of hinged members depending in the receptacle hinged together at their lower end and with the upper end of one of the members provided with an indicating finger adapted to move over a graduated dial, and a float provided with a central aperture to receive the two members, so that as the float rises with the level of the fluid in the tank the change of position of the indicating finger determines the volume of the fluid contained in the receptacle.

A still further object is to provide mechanism whereby the oscillatory movement of the upper free end of the movable member is changed to a rotary movement for rotating an indicating finger at a point remote from the receptacle to indicate on a graduated dial the volume of fluid contained in the receptacle.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figure 1. is a transverse sectional view of so much of a receptacle as will illustrate this invention, showing a portion of the gage in section and other portions in side elevation; Fig. 2, is a plan view of the float; Fig. 3, is a side elevation of one dial looking from the left in Fig. 1; Fig. 4, is a plan view of the device and a portion of the mechanism shown in Fig. 1; and, Fig. 5, is a transverse sectional view of the graduated dial and indicating finger shown in Fig. 1.

Referring to the drawings in detail, the reference numeral 1 denotes the upper wall of a fluid-receptacle which is provided with an opening and in which is mounted a cup-shaped member 2 provided in the lower wall thereof with a slot 3. Mounted in the lower wall of the cup-shaped member 3 are a pair of bearings 4 in which is mounted a shaft 5. Between the bearings 4 the shaft 5 is twisted into a thin spiral member 6. Extending laterally from the cup-shaped member 2 is a tube-like extension 7 bearing at its upper end a cup-shaped member 8 the face 9 of which is provided with a graduated dial. Mounted on the end of the shaft 5 and rotating in proximity to the graduated dial 9 is an indicating finger 10. Depending in the tank and preferably secured at its upper end to the cup-shaped member 2 is a bar 11 preferably formed upon curvilinear lines and provided at its lower end with a pin or bolt 12 constituting a pivot. Pivotally mounted on the pin 12 is a rod 13 the upper end of which is provided with an indicating finger 14, arranged to travel over the face of a graduated dial 16 on the upper face of the lower wall of the cup-shaped member 2. The rod 13 passes through the slot 3 and is freely movable longitudinally of the slot. The upper end of the rod 13 is slotted or bifurcated to receive the thin twisted portion 6 of the shaft 5. Longitudinally slidably mounted on the members 11 and 13 is a float 17 provided with a central orifice 18 suitably shaped and of sufficient size to receive both the member 11 and the rod 13.

In operation, the device is set up and the receptacle filled with a liquid which causes the float 17 to rise, in doing which it causes the upper end of the rod 13, carrying the index finger 14, to move across the graduated dial 16 and at the same time, the movement of the upper slotted end of the rod 13 engaging the flat twisted portion 6 of the shaft 5 tends to rotate the same to rotate the index finger 10 over the face of the graduated dial 9.

It will be obvious that the graduated dial 16 and index finger 14 may be omitted and the reading of the index finger on the dial 9 be relied upon wholly to determine the volume of the fluid in the receptacle, or the graduated dial 9 and the index finger 10 may be omitted and the determining of the contents of the receptacle may be ascertained from an inspection of the position of the finger 14 with respect to the graduated dial 16.

I claim:

1. A fluid gage embodying two members pivotally hinged together to permit the free oscillation of one member, a float provided with an aperture to receive both of said members and arranged when shifted longitudinally thereof to oscillate one of said members.

2. A fluid gage embodying a depending fixed member formed upon curvilinear lines, an oscillatory member pivotally hinged to said fixed member, a float provided with an aperture inclosing both members and arranged when shifted to oscillate said pivoted member to thereby indicate the volume of fluid contained in a receptacle.

3. A fluid gage embodying a receptacle provided with a slot, a fixed depending member in said receptacle, an oscillatory member pivotally secured to said fixed member, the upper end of said oscillatory member extending through said slot, a graduated dial near said slot, a float provided with an aperture to receive said fixed and oscillatory members and arranged when shifted to oscillate said pivoted member to indicate on said dial the volume of contents in said receptacle.

4. A fluid gage embodying a receptacle provided with a slot in its upper wall, a fixed depending member in said receptacle, an oscillatory member pivotally united to said fixed member, the upper end of said oscillatory member projecting through said slot, a graduated dial near said slot, an index finger carried by the upper end of said oscillatory member, a float provided with an aperture to receive said fixed and oscillatory members and arranged when shifted to oscillate said pivoted member to move said index finger over said graduated dial.

5. A fluid gage embodying a receptacle provided with a slot in its upper wall, a fixed depending member in said receptacle, an oscillatory member pivotally united to said fixed member, the upper end of which projects through said slot, a float provided with an aperture to receive said fixed and oscillatory members and arranged to oscillate the latter when vertically shifted, a rotary shaft mounted adjacent to said slot, an index finger carried by said shaft, and means carried by said oscillatory member and shaft to cause a rotation of the latter when the former is oscillated.

6. A fluid gage comprising a receptacle provided with a slot in its upper wall, a pair of members depending in said receptacle and pivotally hinged together, one of said members projecting through said slot, a float provided with an aperture adapted to receive said members and when shifted vertically to oscillate the member projecting through said slot, a shaft mounted adjacent to said slot and engaging said oscillatory member, indicating means carried by said shaft, said shaft arranged to be rotated by the said pivoted member when the latter is oscillated.

7. A fluid gage comprising a receptacle provided with a slot in its upper wall, a pair of members depending in said receptacle and pivotally united, one of said members projecting through said slot, an index finger on the free end of said member, a graduated dial near said slot, a float provided with an aperture to receive said depending members, and arranged when vertically shifted to oscillate said pivoted member, a shaft mounted near said slot, indicating means carried by said shaft, a graduated dial positioned adjacent to said indicating means, and means connecting said shaft and oscillatory member whereby the oscillations of the latter rotate the former and said indicating means.

8. A fluid gage comprising a receptacle provided with a slot in its upper wall, a pair of members depending in said receptacle and pivotally hinged together, one of said members projecting through said slot, said member provided above said slot with an opening, a float provided with an aperture adapted to receive said members and when shifted vertically to oscillate the member projecting through said slot, a shaft mounted adjacent to said slot and provided with a spirally-formed portion extending through the opening in said oscillatory member, indicating means carried by said shaft, said shaft arranged to be rotated by said pivoted member when the latter is oscillated.

In testimony whereof I have hereunto set my hand in presence of two subscribing witnesses.

PERRY E. TANNER.

Witnesses:
A. L. McClintock,
C. E. Humphrey.